UNITED STATES PATENT OFFICE.

MELCHIOR BÖNIGER, OF BASLE, SWITZERLAND, ASSIGNOR TO CHEMISCHE FABRIK, VORMALS SANDOZ, OF SAME PLACE.

TRISAZO DYE.

SPECIFICATION forming part of Letters Patent No. 591,616, dated October 12, 1897.

Application filed June 26, 1897. Serial No. 642,412. (Specimens.) Patented in France December 11, 1896, No. 262,109, and in England December 16, 1896, No. 28,810.

*To all whom it may concern:*

Be it known that I, MELCHIOR BÖNIGER, chemist, residing at Basle, Switzerland, have invented new and useful Improvements in the Manufacture of Trisazo Dyestuffs, of which the following is a specification, and for which there is a patent of France, No. 262,109, dated December 11, 1896, and a patent of Great Britain, No. 28,810, dated December 16, 1896.

For the production of substantive trisazo coloring-matters the tetrazo compounds of paradiamins have been frequently combined in molecular proportions with amins. The intermediate products thus obtained have been rediazotised and then combined with two molecules of an azo component. The amins proposed as suitable for this purpose are alpha-naphthylamin, Cleve's alpha-naphthylamin-sulfonic acids, and a number of amidonaphthol-sulfonic acids. Hitherto, however, it has been found impossible to replace these compounds by ordinary amins of the benzene series, because by the process hereinbefore referred to no amidoazo compounds capable of further diazotisation were formed, but only diazoamido compounds. Now I have discovered that the easily-accessible paraxylidin ($CH_3 : NH_2 : CH_3 = 1:2:4$) proves to be an exception to this rule, since the intermediate products obtained from one molecule of a tetrazo compound and one molecule of paraxylidin can be readily diazotised and be further combined without decomposition. Of the coloring-matters prepared in this manner the products obtained by acting with the rediazotised bodies on two molecules of amidonaphthol-disulfonic acid H have proved to be most valuable. On using the tetrazo bodies of paradiamins, well known as components of dyestuffs—viz., benzidin, tolidin, and dianisidin—coloring-matters are hereby obtained which dye unmordanted cotton in shades varying from intense indigo to a greenish blue and which are capable of diazotisation on the fiber and of producing thereon by combination with beta-naphthol deep-black shades perfectly fast to washing.

In carrying out my invention the following mode of operation may be employed: 9.2 kilos of benzidin are dissolved in two hundred liters of water acidulated with twenty-eight kilos of muriatic acid of 21° Baumé and then diazotised in the usual manner with 6.9 kilos of nitrite of soda. Thereupon a solution of 6.1 kilos of paraxylidin, eighty liters of water, and six kilos of muriatic acid of 21° Baumé is added at a temperature of about 5° centigrade to the clear tetrazo solution. The mixture is stirred for about two hours, when a part of the intermediate product separates as a brown precipitate. To complete the reaction, a solution of sodium acetate prepared by neutralization of 7.5 kilos caustic soda with about twenty-eight kilos of acetic acid of forty per cent. is added and the mixture is stirred at a temperature not exceeding 5° centigrade for about three to four hours until unchanged tetrazo-diphenyl can no more be identified. The mixture is then acidulated with thirty kilos of muriatic acid of 20° Baumé and diazotised by the gradual addition of a solution containing 3.5 kilos of sodium nitrite. The resulting solution, which is of an intensely reddish-yellow color, is now allowed to react on a solution of 35.4 kilos of amidonaphthol-disulfonic acid H (acid sodium salt of one hundred per cent.) in six hundred liters of water, four kilos of caustic soda, and forty kilos of sodium carbonate. After some hours standing the new coloring-matter is heated to boiling, precipitated by addition of two hundred kilos of common salt, filtered and dried in the usual way.

By substituting in the above process benzidin by equivalent weights of tolidin or dianisidin similar coloring-matters are produced, as is the case in other processes for producing coloring-matters.

These three new coloring-matters have the form of powder of slaty to purplish-brown color and are easily soluble in water and also in methylic alcohol, however, very sparingly soluble in ethyl alcohol. They dissolve in strong sulfuric acid with greenish-blue color and dye unmordanted cotton from a bath containing common salt intense blue shades, ranging between indigo and dark-greenish blue. When diazotised on the fiber, by combination with beta-naphthol a deep black, with metaphenylene-diamin a greenish black, and with resorcinol a dark green is produced. Reducing agents such as protochlorid of tin or zinc-dust destroy the new coloring-matters and regenerate benzidin, tolidin, or dianisidin. Besides the original diamido base there are formed paradiamido-paraxylol and an easily-soluble sulfo-acid of the naphthalene series, whose neutral solution is colored red by oxidation with air.

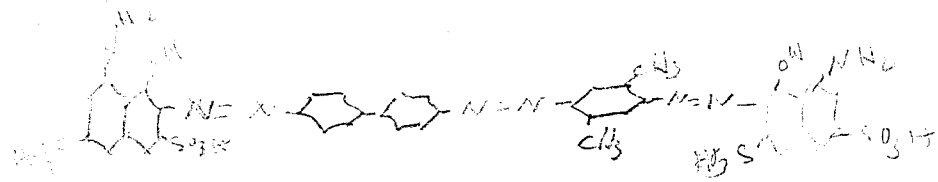

Having thus described my invention, what I claim, and desire to secure by Letters Patent, is—

1. The process of producing substantive trisazo coloring-matters which consists in combining one molecule of the tetrazo compound of a paradiamin such as benzidin with one molecule of paraxylidin to form intermediate products, in rediazotising these intermediate products and in combining the thus-produced tetrazo compounds with two molecules of amidonaphthol-disulfonic acid H, substantially as hereinbefore described.

2. The within-described new trisazo dye-stuffs of the general formula

Paradiamin$\diagdown$ paraxylidinamidonaphthol-sulfonic acid H
amidonaphthol-sulfonic acid H, being powders of slaty to purplish-brown color, easily soluble in water and methylic alcohol but very sparingly soluble in ethyl alcohol, dissolving in strong sulfuric acid with greenish-blue color; dyeing unmordanted cotton from a bath containing common salt in intense blue shades ranging between indigo and dark-greenish blue; producing when diazotised on the fiber by combination with beta-naphthol a deep black, with metaphenylene-diamin a greenish black and with resorcinol a dark green.

In testimony whereof I have signed my name to this specification in the presence of two subscribing witnesses.

MELCHIOR BÖNIGER.

Witnesses:
ARNOLD KEINER,
EDUARD SIDLER.